United States Patent
Gohl et al.

(12)

(10) Patent No.: US 6,374,767 B1
(45) Date of Patent: Apr. 23, 2002

(54) ROTATING WARNING BELL

(75) Inventors: Gerald L. Gohl, Hayes Center; Thomas L. Huff, MaCook, both of NE (US); Albert W. Gebhard, Denver, CO (US)

(73) Assignee: Golight, Inc., Culbertson, NE (US)

( * ) Notice: Subject to any disclaimer, the term of this patent is extended or adjusted under 35 U.S.C. 154(b) by 0 days.

(21) Appl. No.: 09/510,255

(22) Filed: Feb. 22, 2000

(51) Int. Cl.$^7$ ............................... B60Q 1/26; B60Q 5/00
(52) U.S. Cl. ............................. 116/152; 116/60; 116/56
(58) Field of Search ................................ 116/148, 152, 116/154–165, 167, 60–62, 74, 67 R, 57, 35 R, 56

(56) References Cited

U.S. PATENT DOCUMENTS

| | | | | |
|---|---|---|---|---|
| 497,534 A | * | 5/1893 | Close ........................... | 116/25 |
| 547,186 A | * | 10/1895 | Shaw ........................... | 116/152 |
| 617,602 A | * | 1/1899 | Price ........................... | 116/61 |
| 1,223,965 A | | 4/1917 | Gumaer ....................... | 116/61 |
| 1,225,036 A | | 5/1917 | Kieren ........................ | 116/60 |
| 1,226,010 A | | 5/1917 | Rockwell .................... | 116/60 |
| 1,331,329 A | * | 2/1920 | Durant ........................ | 116/164 |
| 1,905,261 A | * | 4/1933 | Bernstrom ................... | 116/74 |
| 2,495,698 A | * | 1/1950 | Chilson ....................... | 116/154 |
| 2,843,075 A | | 7/1958 | Geraghty ..................... | 116/60 |
| 2,900,948 A | | 8/1959 | Krynak ........................ | 116/60 |
| 2,915,036 A | * | 12/1959 | Bookwalter ................. | 116/35 R |
| 3,039,423 A | | 6/1962 | Warn ........................... | 116/60 |
| 3,072,092 A | | 1/1963 | Krynak ........................ | 116/60 |
| 3,092,069 A | * | 6/1963 | Baird .......................... | 116/60 |
| 4,646,064 A | * | 2/1987 | Palmer et al. .............. | 340/392.3 |

* cited by examiner

Primary Examiner—Diego Gutierrez
Assistant Examiner—R. Alexander Smith
(74) Attorney, Agent, or Firm—Rick Martin; Patent Law Officees of Rick Martin, P.C.

(57) ABSTRACT

A railroad car-warning bell is centrally mounted on the hub of a wheel. Three opposed cylinder housings each contain a reciprocating ball which hits an end hammer to sound the bell when the wheel turns slowly up to speeds of nominally 15 mph. At higher speeds the balls are held against the end hammers, thereby automatically shutting off the bell to prevent noise pollution. The preferred embodiment has a single cylinder mounted along a diameter of the ringing bell. Three steel balls oscillate back and forth hitting a hammer at each end of the cylinder. A dampener may be used to adjust the ring of the bell.

23 Claims, 8 Drawing Sheets

ROTATING WARNING BELL

FIELD OF INVENTION

The present invention relates to mechanical rotatable gongs useful for mounting on railroad car wheels to warn persons of the movement of a railroad car.

BACKGROUND OF THE INVENTION

U.S. Pat. No. 1,225,036 (1917) to Kieren discloses an alarm for cars. A gong is eccentrically mounted on the hub of a railroad or mining car wheel. Inside the gong is mounted a gong sounding mechanism consisting of a cylindrical casing having inside a reciprocating metal ball. When the wheel rotates the metal ball reciprocates hitting a hammer at one end of the cylinder, thereby sounding the gong with each revolution of the wheel. The device is especially suited for mining carts, which move slowly in the dark.

The device is not suited for high-speed railroad car use because the gong would continue to sound even at high speeds. Such high speed gonging would only create noise pollution on each side of the moving train. Powerful whistles aimed forward are used to sound warnings of approaching high-speed trains.

The present invention embellishes the Kieren concept by centrally mounting a single-cylinder gong sounding mechanism. At about fifteen miles per hour the metal balls in a cylinder having a length along a diameter of the wheel are held against its hammer by centrifugal force. Therefore, the gong stops sounding at speeds over about fifteen miles per hour. Furthermore, when the gong does sound it offers two gongs for each rotation of the wheel, since the cylinder has a hammer at each end. This feature offers more sound as well as redundancy to provide functionality even after mechanical failure of an individual hammer.

SUMMARY OF THE INVENTION

The main aspect of the present invention is to provide an alarm gong on the rotating wheel of a vehicle which sounds only at low speeds.

Another aspect of the present invention is to provide mechanical redundancy for a simple gong sounding mechanism.

Another aspect of the present invention is to provide an universal mounting plate which fits several sized wheel stud bolts.

Another aspect of the present invention is to provide a dampener for a gong.

Other aspects of this invention will appear from the following description and appended claims, reference being made to the accompanying drawings forming a part of this specification wherein like reference characters designate corresponding parts in the several views.

The preferred embodiment teaches a cast aluminum, one cylinder striker housing with a hammer at each end. Other material choices include glass filled nylon or a molded polymer. The cylinder houses three balls, two end hammers and a return spring to retract the end hammer away from the gong after a strike. A gong surrounds the striker housing. The gong and striker housing mount to a universal mounting plate which in turn is fastened to a trio of wheel studs via nuts. As the train travels at a speed nominally set at fifteen miles per hour, the double hammers clang twice per wheel revolution. This double striking action provides mechanical backup since the gong will sound even with one hammer down. For speeds over fifteen miles per hour the metal balls are held against one end hammer by centrifugal force. Thus, no reciprocation of the metal balls occur, and no gonging occurs above this preset speed.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
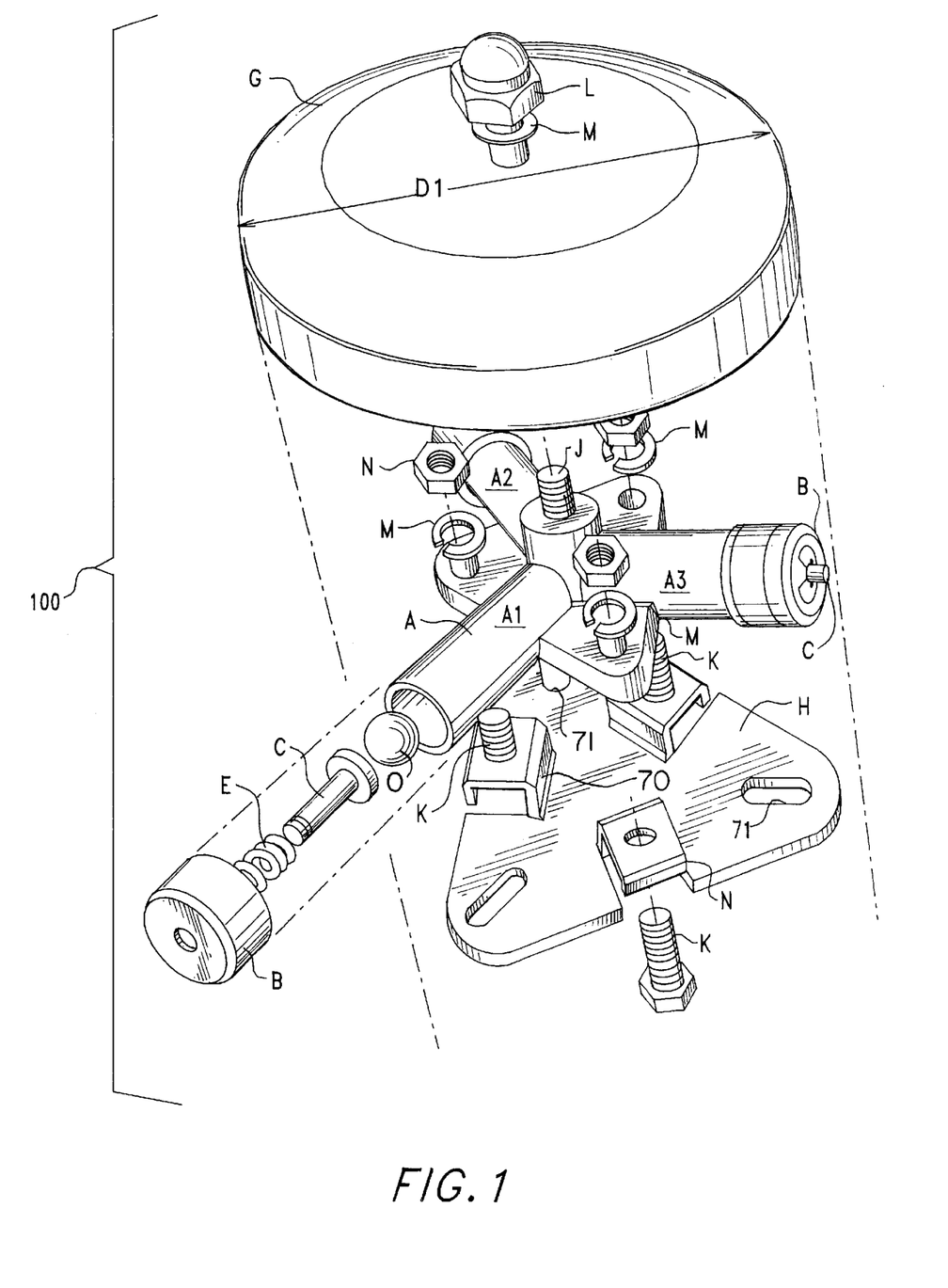
FIG. 1 is an exploded view of an alternate embodiment three cylinder bell not having a dampener.

Referring first to FIG. 1 a bell G of bell assembly 100 has a nominal diameter $d_1$ of six inches. An acorn nut L and back washer M secures the bell G to a housing bolt J. A striker housing A is made preferably from cast aluminum. Each cylindrical housing $A_1, A_2, A_3$ contains a metal ball O which via centrifugal force hits the striker C which sounds the bell G. A striker spring E retracts the striker C from the bell G, thereby allowing the bell to resonate. The striker spring E also adds to the return force to send the metal ball back toward, the end of the cylinder housing opposite the striker.

Figure 3:
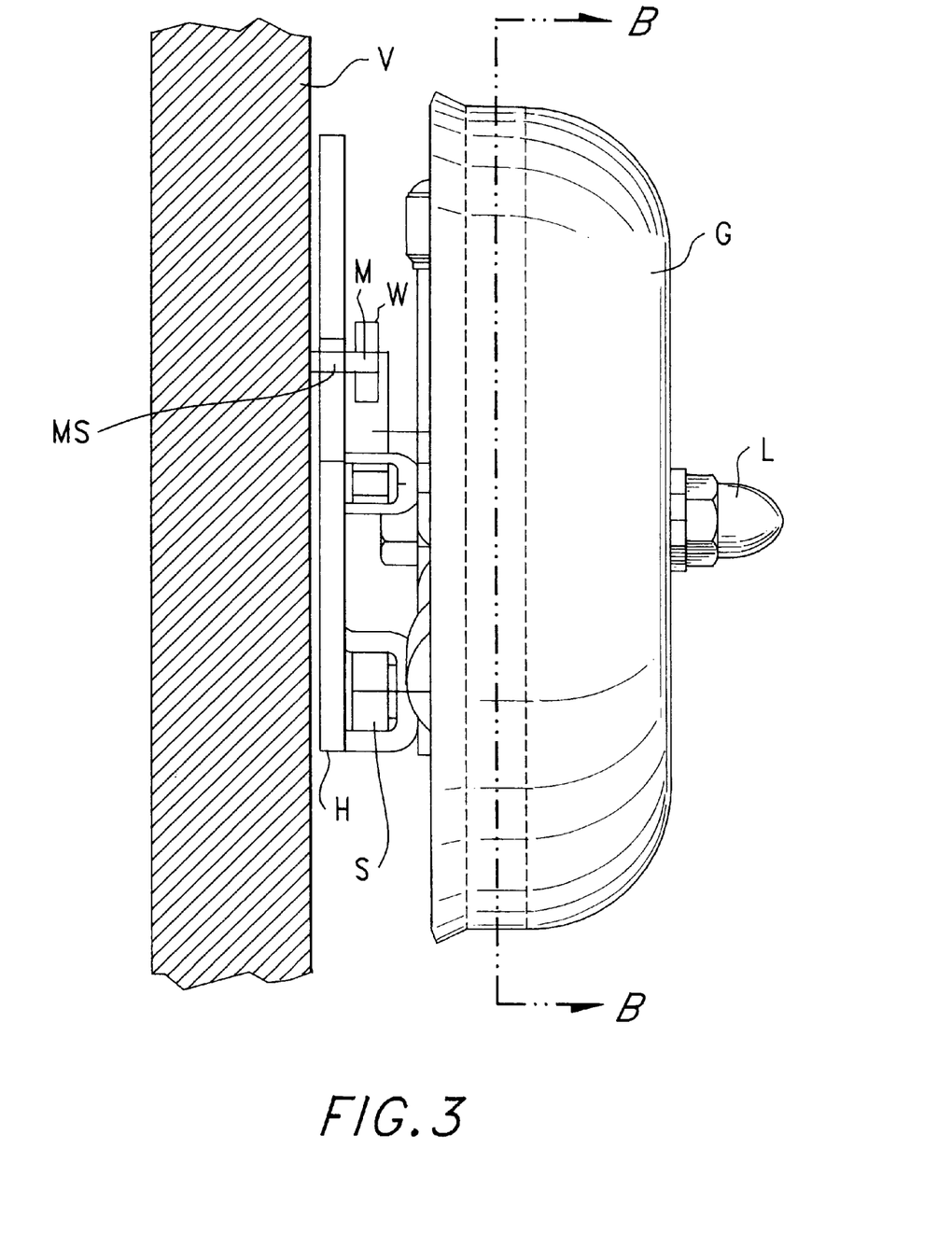
FIG. 3 is a side plan view of the bell shown in FIG. 2.

A mounting plate H has wheel mounting slots 71 to accommodate several different dimensions and layouts of wheel studs of a railroad wheel (see FIG. 3). Mounting plate bolts K, lock washers M and nuts N secure the striker housing A to the mounting plate H. Bolts K may be welded to plate H.

In operation at speeds under about fifteen miles per hour the bell sounds. However, at speeds over fifteen miles per hour the centrifugal force of the rotating railroad wheel forces the metal balls O against the striker C, and the bell stops sounding.

Figure 2:
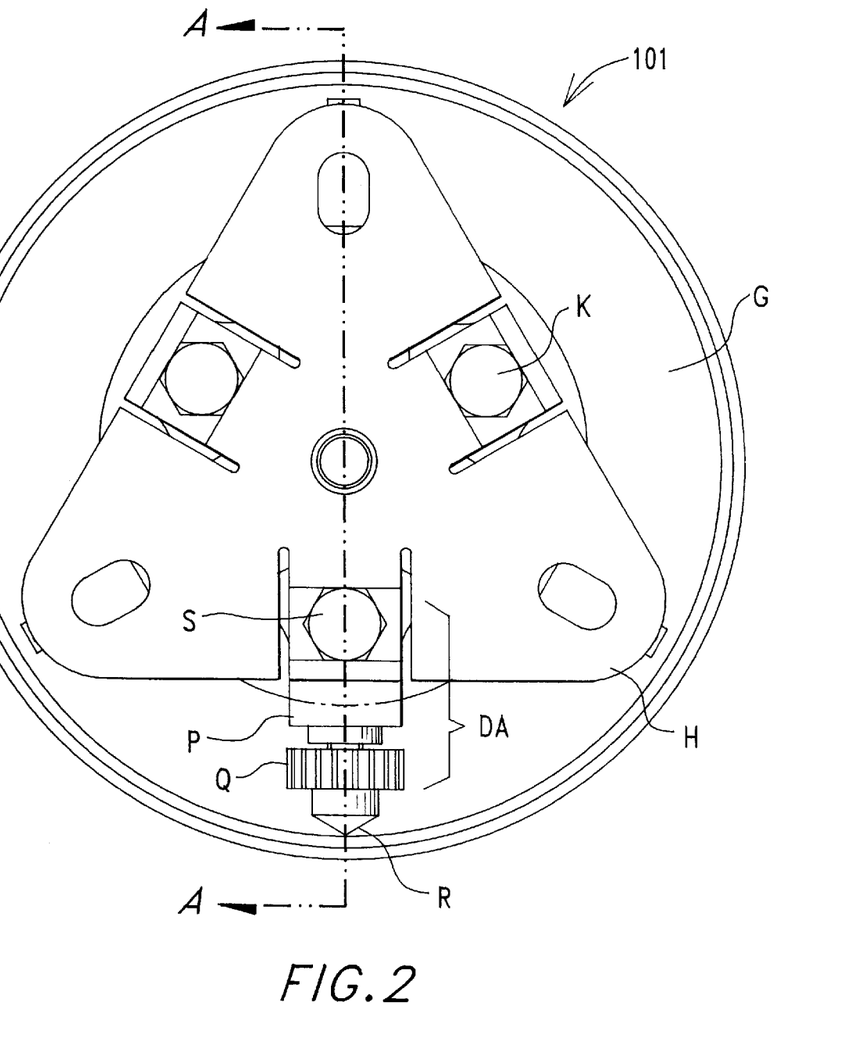
FIG. 2 is a bottom plan view of an alternate three cylinder embodiment having a dampener.

Referring next to FIG. 2 this preferred embodiment 101 has a dampener assembly DA which consists of a dampener bolt S, a dampener mount P, a dampener knob Q, and a dampener nose R.

Referring next to FIG. 3 a wheel V has mounting studs MS. A nut W and lock washer M secures the mounting plate H to the wheel V.

Figure 4:
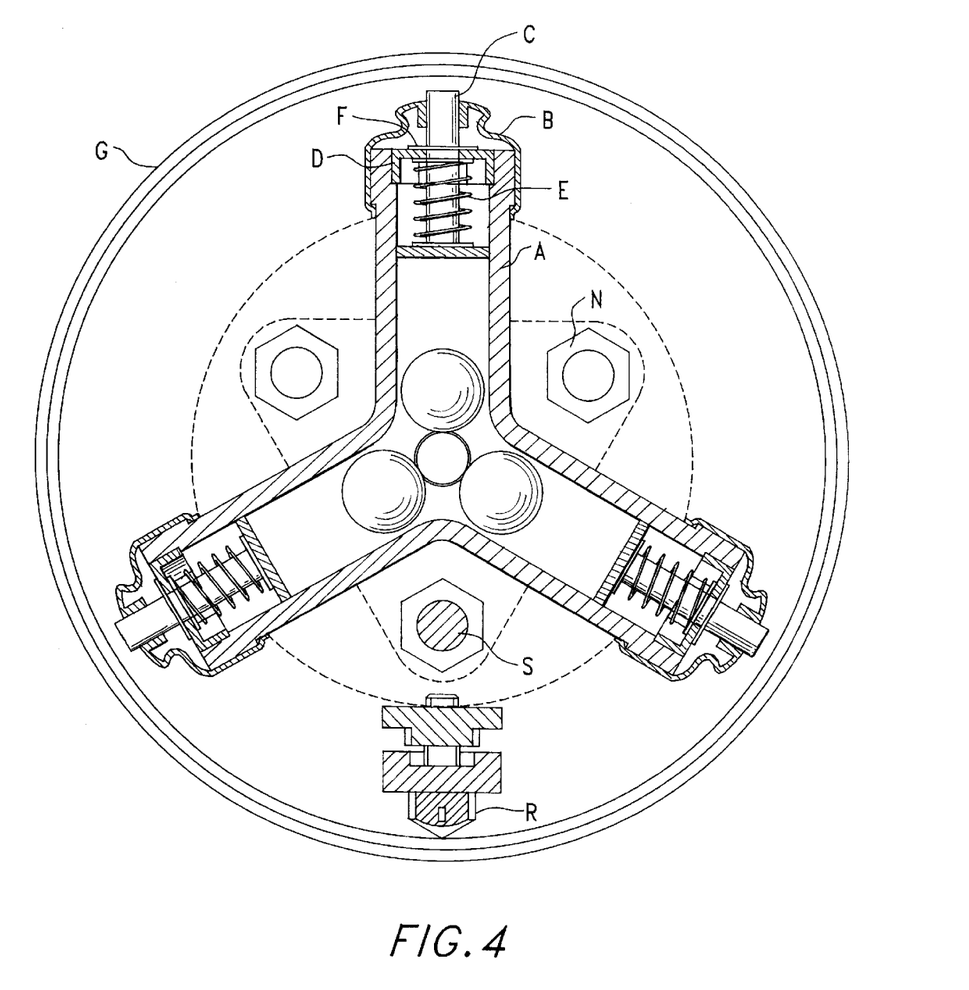
FIG. 4 is a sectional view taken along line B—B of FIG. 3.
Figure 5:
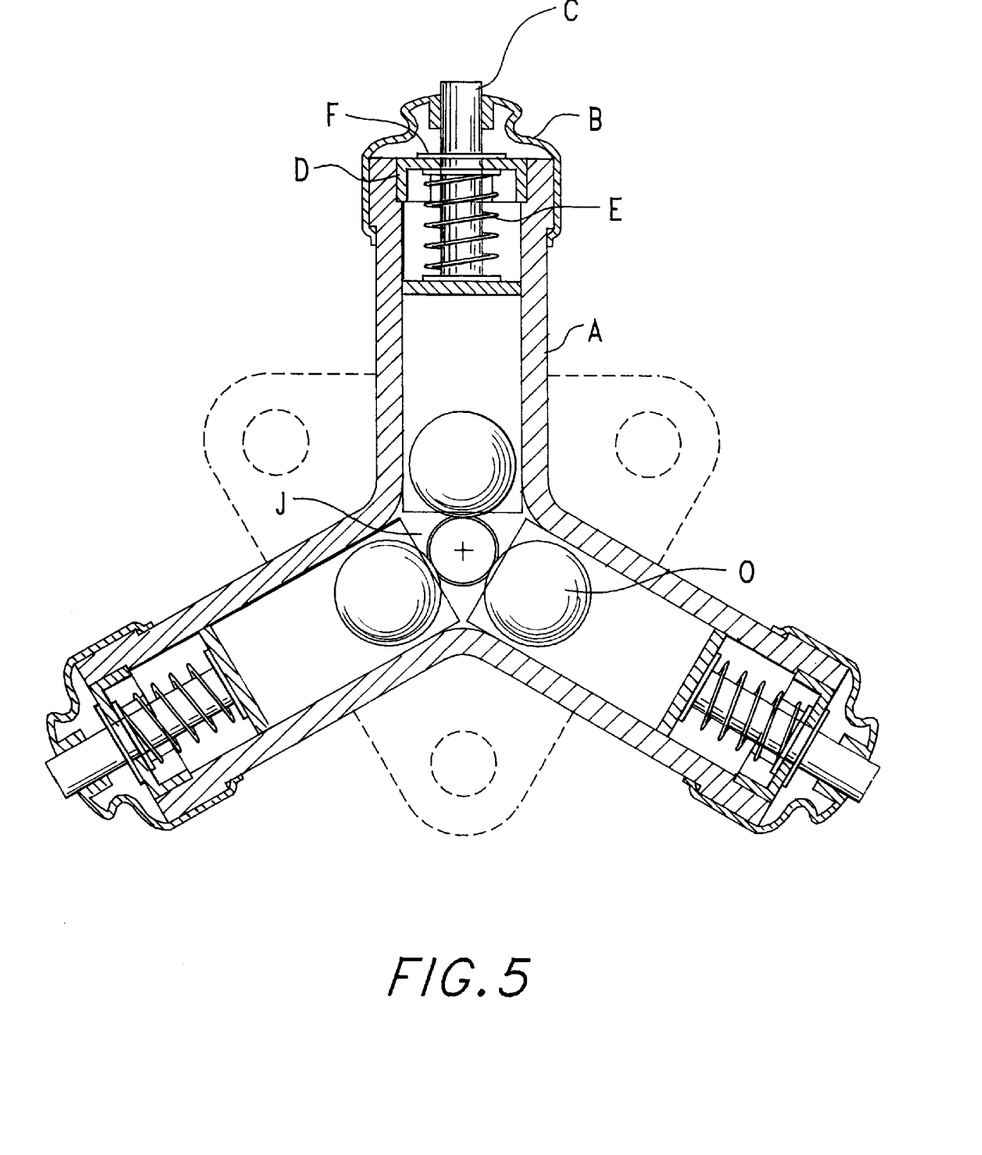
FIG. 5 is a longitudinal sectional view of the striker housing of the embodiment shown in FIG. 2.

Referring next to FIGS. 4,5 and end cap D and circlip F retain the striker spring E inside the striker housing A. A boot B environmentally encloses the end cap D.

Figure 6:
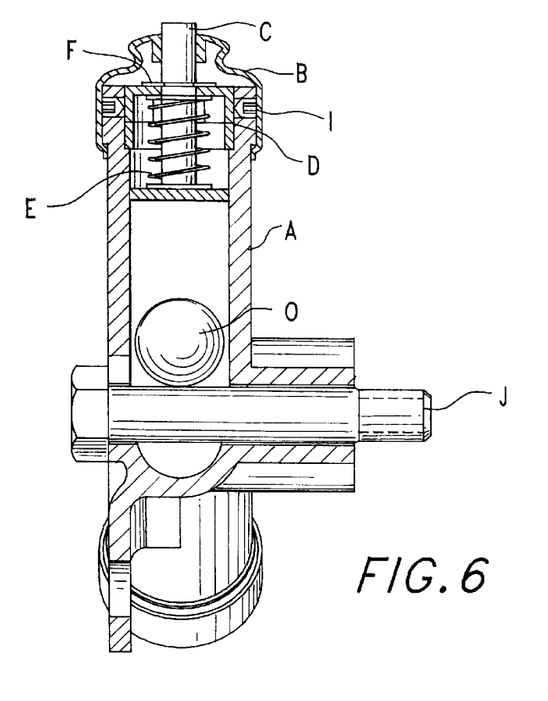
FIG. 6 is a cross sectional view of the striker housing.

Referring next to FIG. 6 the housing set screw(s) I retain the end caps D in place, and/or the end cap D are held via a snap fit.

Figure 7:
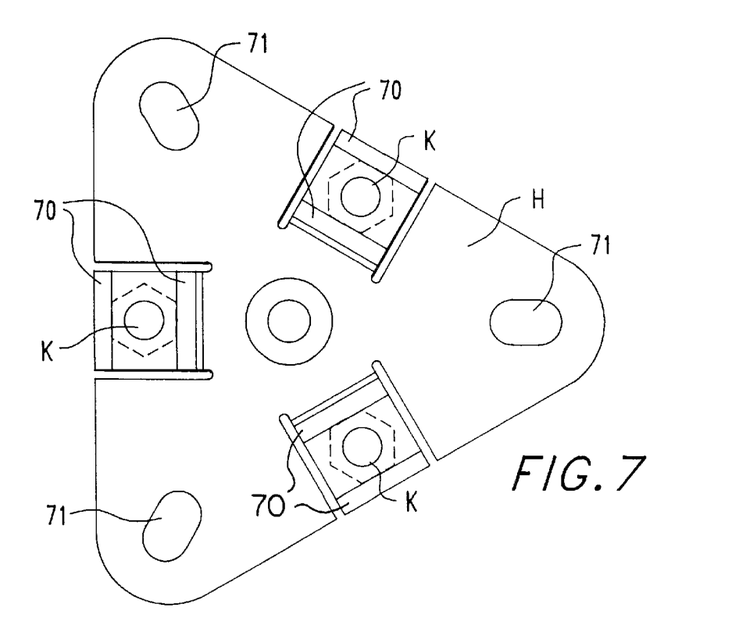
FIG. 7 is a top plan view of the mounting plate shown in FIG. 1

Referring next to FIG. 7 the channels 70 retain the heads of the bolts K in place, preferably via a weld.

Figure 8:
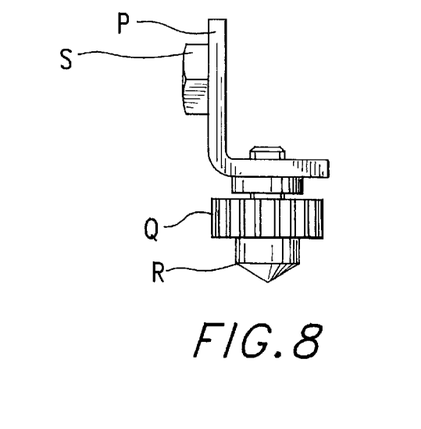
FIG. 8 is a side plan view of the dampener shown in FIG. 2.

Referring next to FIG. 8 the dampener is shown in a side plan view. The dampener allows adjustment of the bell's volume.

| ID | Name | Material | Description | Qty. |
|---|---|---|---|---|
| | | BILL OF MATERIALS | | |
| A | Striker Housing | Cast Aluminum or molded nylon | Cast/molded | 1 |
| B | Boot | Elastomer | | 3 |
| C | Striker | Hardened Steel | Cold Formed | 3 |
| D | End Cap | Steel or molded plastic | Cold Formed or molded | 3 |
| E | Striker Spring | Spring Steel 28 GA (stainless) | | 3 |
| F | Circlip | Spring Steel | | 3 |
| G | Bell | Machined Brass or stamped steel | | 1 |
| H | Mounting Plate | Sheet Steel 9 GA, ⅛" thick | Stamped | 1 |
| I | Set Screw | | #5 × 5/32 Cone Point | 6 |
| J | Housing Bolt | | .375 × 2.25 Hex Head Bolt | 1 |
| K | Mounting Plate Bolt | | .375 × .875 Hex Head Bolt | 2 |
| L | Acorn Nut | | ⅜ Acorn Nut | 1 |
| M | Lock Washer | | ⅜ Lock Washer | 4 |
| N | Nut | | ⅜ Machine Nut | 3 |
| O | Metal Ball | Steel (Or Denser Material) | | 3 |
| P | Dampener Mount | Cast Iron (Or stamped Steel Var. or aluminum/plastic | | 1 |
| Q | Dampener Knob | Steel | Machined part | 1 |
| R | Dampener Nose | Elastomer | Molded Part | 1 |
| S | Dampener Bolt | | .375 × 1.00 Hex Head Bolt | 1 |
| $D_1$ | Six Inches | | | |

Figure 9:
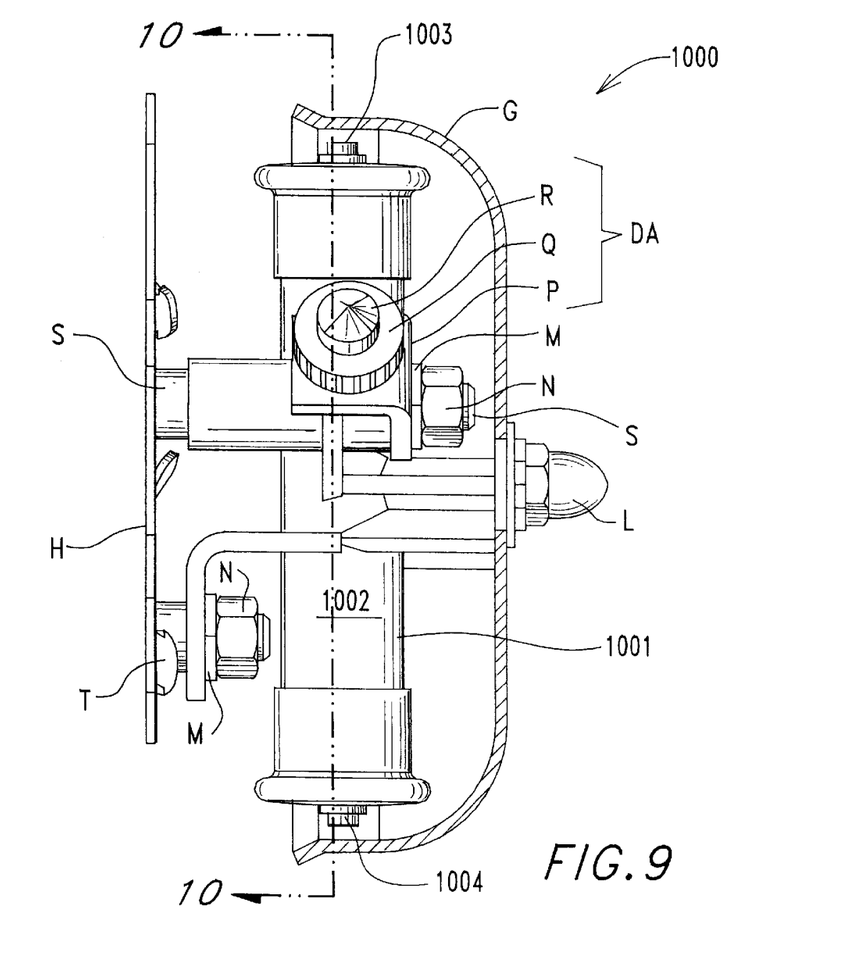
FIG. 9 is a side plan view, partially cutaway of the preferred embodiment single cylinder, dual hammer bell.

In FIG. 9 the preferred embodiment bell assembly 1000 is shown to have a mounting plate H which supports a striker housing 1001. The striker housing 1001 comprises a single cylinder 1002 which extends across a diameter of bell G. The cylinder 1002 has two hammers 1003, 1004. The dampener assembly DA is unchanged from FIG. 2.

Figure 10:
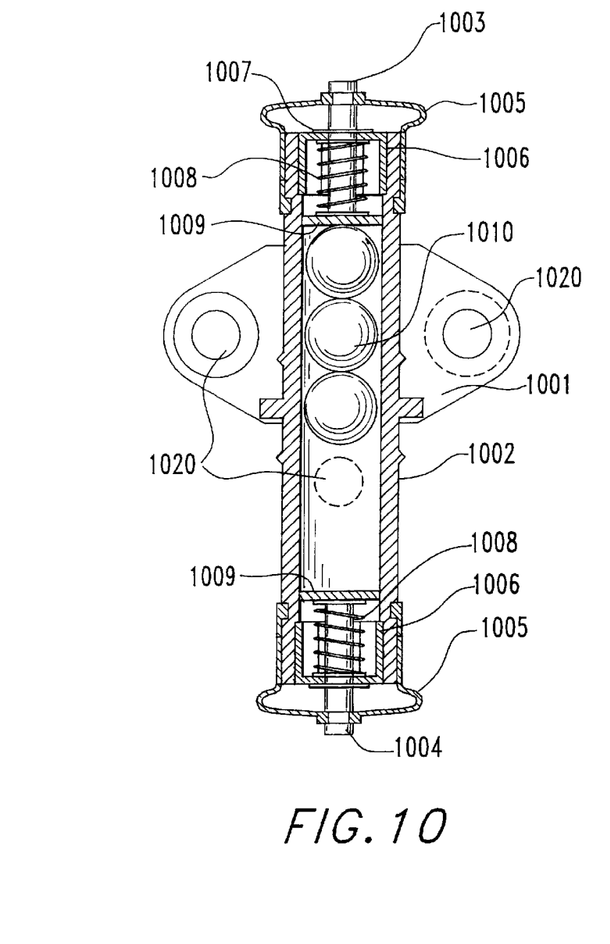
FIG. 10 is a longitudinal sectional view of the cylinder shown in FIG. 9, with the bell and dampener removed, taken along line 10—10 of FIG. 9.
Figure 11:
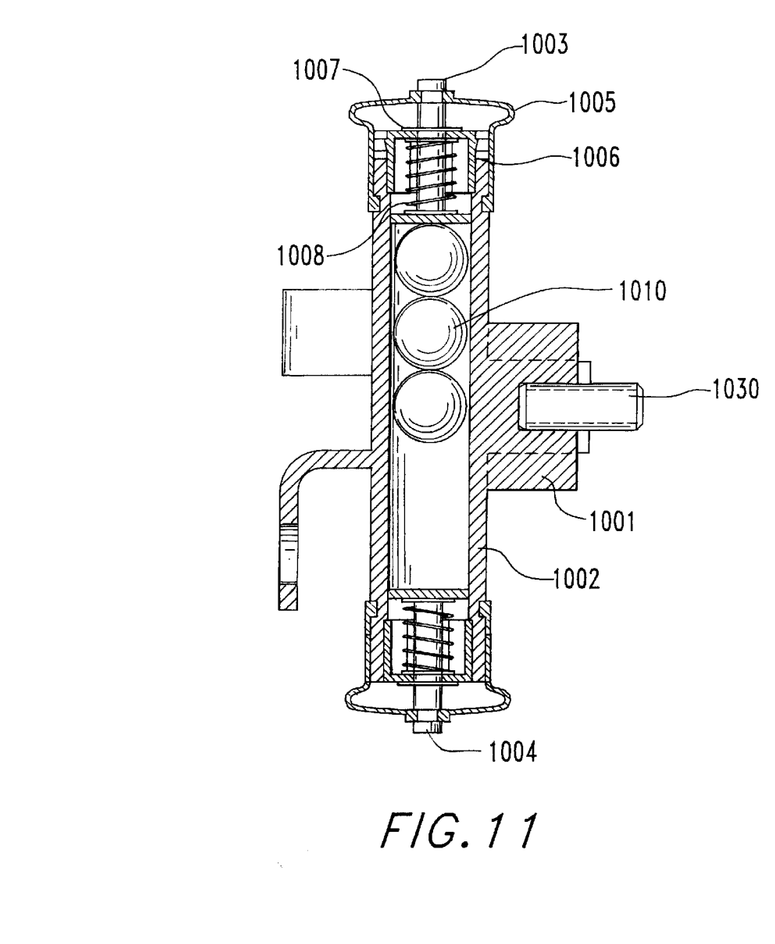
FIG. 11 is a longitudinal sectional view of the cylinder shown in FIG. 9, taken from a side perspective.

Referring next to FIGS. 10,11 the cylinder 1002 has identical hammer assemblies at each end comprising a hammer (1003, 1004), a boot 1005, an end cap 1006, a circlip 1007, a spring 1008, and a hammer base 1009. The three steel balls 1010 create a considerable moment as they oscillate from one hammer base to the opposite hammer base at speeds up to about 15 MPH. The bell works quite well even with two steel balls which give a strong hit to the hammer, yet offer very low coefficient of friction while rolling. At higher speeds they remain at one end of the cylinder 1002. The striker housing 1001 has three mounting holes 1020 for a bolt attachment to the mounting plate H, wherein preferably a bolt head is welded to the mounting plate H for nut N and lock washer M lock to. The bolt 1030 secures the bell G.

Although the present invention has been described with reference to preferred embodiments, numerous modifications and variations can be made and still the result will come within the scope of the invention. No limitation with respect to the specific embodiments disclosed herein is intended or should be inferred.

We claim:

1. A rotationally activated bell comprising:
   a center of a wheel mount;
   a multi-cylinder striker housing secured to the mount;
   a bell mounted adjacent the striker housing; and
   a reciprocating ball in each said cylinder which hits a striker in the cylinder, thereby sounding the bell upon a rotation of the striker housing.

2. The bell of claim 1, wherein each said cylinder further comprises a striker spring and an end cap.

3. The bell of claim 1, wherein the striker housing further comprises a housing bolt for securing the bell.

4. The bell of claim 1, wherein the multi-cylinder striker housing further comprises three said cylinders symmetrically disposed from a center of the striker housing.

5. The bell of claim 1, wherein the mount further comprises a mounting plate having wheel stud slots and a hole for a striker housing bolt.

6. The bell of claim 5, wherein the mounting plate further comprises a channel to secure a mounting plate bolt.

7. The bell of claim 1, further comprising a dampener.

8. The bell of claim 1, further comprising an automatic centrifugal shutoff.

9. A rotatably sounded warning gong comprising:
   a mount for a wheel hub;
   a multi-cylinder striker assembly; and
   a gong mounted over the multi-cylinder striker assembly, whereby said gong is sounded upon a rotation of the striker assembly; and
   wherein the mount further comprises a central mounting plate having a plurality of wheel stud slots to accommodate various layouts of wheel studs.

10. The rotatably sounded warning gong of claim 9, further comprising an automatic shut off mechanism, whereby a rotation of the striker assembly over a preset speed terminates a sounding of the gong.

11. The rotatably sounded warning gong of claim 9, wherein the multi-cylinder striker assembly further comprises a plurality of cylinders each having a ball and a striker.

12. The rotatably sounded warning gong of claim 11, wherein the cylinders each have a striker spring and an end cap.

13. In combination with a rotatable wheel having a central hub an alarm gong improvement comprising:
   a mounting plate for the hub;
   a multi-chamber striker assembly secured to the mounting plate;
   a gong mounted adjacent the striker assembly; and
   a high speed shutoff mechanism incorporated with the striker assembly; and
   wherein the multi-chamber striker assembly further comprises a plurality of outward facing cylinder housings, each said cylinder housing having an end hammer and a reciprocal ball striking the hammer upon a rotation of the multi-chamber striker assembly.

14. The improvement of claim 13, wherein the mounting plate further comprises slots for wheel studs to provide a central mount for the mounting plate.

15. The improvement of claim 13, wherein the high speed shutoff mechanism comprises a centrifugal force holding the ball against the end hammer.

16. The improvement of claim 13, wherein the gong further comprises a dampener.

17. The improvement of claim 13, wherein there are three of said cylinder housings.

18. The improvement of claim 17, wherein the multi-chamber striker assembly has a one piece construction.

19. A bell assembly comprising:

a striker housing having a mount for a rotatable wheel;

a bell mounted atop the striker housing;

a hollow shaft supported by the striker housing along a diameter of the bell;

said shaft having a spring loaded hammer at each of its two ends; and a reciprocatable member housed inside the shaft, wherein a rotation of the wheel causes two hammer blows to the bell each rotation.

20. The apparatus of claim 19, wherein the mount comprises a plate removably attached to the striker housing, said plate having slotted mounting holes to accommodate a variety of wheel hubs.

21. The apparatus of claim 19, wherein the bell further comprises a gong covering the striker housing.

22. The apparatus of claim 19, wherein the hollow shaft further comprises a cylinder.

23. The apparatus of claim 19, wherein the reciprocatable member further comprises two metal balls.

* * * * *